(12) United States Patent
Nicoll et al.

(10) Patent No.: US 11,212,322 B2
(45) Date of Patent: Dec. 28, 2021

(54) AUTOMATED DISCOVERY OF SECURITY POLICY FROM DESIGN DATA

(71) Applicant: Rockwell Automation Technologies, Inc., Mayfield Heights, OH (US)

(72) Inventors: Alex L. Nicoll, Brookfield, WI (US); Kyle Crum, Bayside, WI (US); Taryl J. Jasper, South Euclid, OH (US); Michael A. Bush, Hudson, OH (US); Jack M. Visoky, Willoughby, OH (US)

(73) Assignee: ROCKWELLL AUTOMATION TECHNOLOGIES, INC., Mayfield Heights, OH (US)

( * ) Notice: Subject to any disclaimer, the term of this patent is extended or adjusted under 35 U.S.C. 154(b) by 153 days.

(21) Appl. No.: 16/156,305

(22) Filed: Oct. 10, 2018

(65) Prior Publication Data
US 2020/0120143 A1    Apr. 16, 2020

(51) Int. Cl.
*H04L 29/06* (2006.01)

(52) U.S. Cl.
CPC ........ *H04L 63/205* (2013.01); *H04L 63/0227* (2013.01)

(58) Field of Classification Search
CPC .... H04L 63/205; H04L 63/0227; H04L 63/20
See application file for complete search history.

(56) References Cited

U.S. PATENT DOCUMENTS

| | | | | |
|---|---|---|---|---|
| 9,767,197 B1* | 9/2017 | Agarwal | ............... | G06F 16/951 |
| 10,417,454 B1* | 9/2019 | Marom | .................. | H04L 63/10 |
| 10,447,815 B2* | 10/2019 | Zandi | ...................... | H04L 67/34 |
| 10,674,399 B2* | 6/2020 | Gardner | .................. | H04L 47/50 |
| 2001/0027484 A1* | 10/2001 | Nishi | ..................... | H04L 45/04 |
| | | | | 709/223 |
| 2001/0039593 A1* | 11/2001 | Hariu | .................. | H04L 61/2535 |
| | | | | 709/249 |
| 2003/0195957 A1* | 10/2003 | Banginwar | ............. | H04L 41/12 |
| | | | | 709/223 |
| 2003/0200062 A1* | 10/2003 | Dessureault | ............ | G06F 30/13 |
| | | | | 703/1 |
| 2004/0193912 A1* | 9/2004 | Li | ............................ | G06F 21/55 |
| | | | | 726/14 |
| 2004/0221051 A1* | 11/2004 | Liong | ..................... | H04L 47/20 |
| | | | | 709/230 |

(Continued)

*Primary Examiner* — Aravind K Moorthy

(57) ABSTRACT

An industrial security policy configuration system generates and implements security policies for industrial automation systems based on design data for the industrial systems generated by device manufacturers, system integrators, original equipment manufacturers, or the owners of the industrial assets during the design of the industrial systems. the collected design data to a security rule set defining device-level communication privileges. The system translates the collected design data to a security rule set defining device-level communication privileges, which are then translated to a comprehensive set of security policies customized to the requirements of the industrial systems represented by the design data. By leveraging the rich set of available design data to identify or infer security requirements and generate suitable security configurations, the system can mitigate the need to manually configure security policies based on human judgments regarding normal and abnormal network traffic.

20 Claims, 11 Drawing Sheets

(56) References Cited

U.S. PATENT DOCUMENTS

| | | | |
|---|---|---|---|
| 2005/0015624 A1* | 1/2005 | Ginter | H04L 63/20 726/4 |
| 2005/0022027 A1* | 1/2005 | Bonn | H04L 63/0263 726/4 |
| 2005/0125687 A1* | 6/2005 | Townsend | G06F 21/55 726/26 |
| 2005/0198283 A1* | 9/2005 | Ramamoorthy | H04L 41/0893 709/225 |
| 2005/0283824 A1* | 12/2005 | Nakamura | H04L 63/20 726/1 |
| 2007/0136821 A1* | 6/2007 | Hershaft | G06F 21/552 726/27 |
| 2008/0279155 A1* | 11/2008 | Pratt, Jr. | H04L 12/66 370/336 |
| 2009/0077621 A1* | 3/2009 | Lang | H04L 63/20 726/1 |
| 2010/0091681 A1* | 4/2010 | Sonoda | H04L 45/54 370/252 |
| 2010/0095348 A1* | 4/2010 | Foster | G06F 21/6236 726/1 |
| 2010/0106958 A1* | 4/2010 | Watanabe | G06F 21/608 713/100 |
| 2011/0093916 A1* | 4/2011 | Lang | G06F 21/57 726/1 |
| 2011/0110268 A1* | 5/2011 | Panasyuk | H04L 41/12 370/254 |
| 2011/0167470 A1* | 7/2011 | Walker | H04W 12/069 726/1 |
| 2011/0213586 A1* | 9/2011 | Kobler | G01D 5/244 702/150 |
| 2011/0276683 A1* | 11/2011 | Goldschlag | H04W 4/00 709/224 |
| 2012/0054495 A1* | 3/2012 | Takahashi | H04L 63/126 713/176 |
| 2012/0158931 A1* | 6/2012 | Ohlman | G06Q 30/0601 709/223 |
| 2012/0291089 A1* | 11/2012 | Bomgardner | G06F 21/6236 726/1 |
| 2013/0305362 A1* | 11/2013 | Hermanns | H04L 63/1441 726/22 |
| 2014/0029031 A1* | 1/2014 | Landwehr | H04L 63/20 358/1.13 |
| 2014/0130119 A1* | 5/2014 | Goldschlag | H04L 63/20 726/1 |
| 2014/0156814 A1* | 6/2014 | Barabash | H04L 41/0803 709/220 |
| 2014/0165134 A1* | 6/2014 | Goldschlag | G06F 21/60 726/1 |
| 2014/0282854 A1* | 9/2014 | Clark | H04L 63/0263 726/1 |
| 2014/0344888 A1* | 11/2014 | Yun | H04L 63/20 726/1 |
| 2015/0004902 A1* | 1/2015 | Pigott | H01L 24/73 455/41.1 |
| 2015/0055656 A1* | 2/2015 | Morimoto | H04L 49/30 370/392 |
| 2015/0229538 A1* | 8/2015 | Burke | H04L 47/76 709/225 |
| 2015/0264088 A1* | 9/2015 | Shimizu | G06F 21/6218 726/1 |
| 2015/0269383 A1* | 9/2015 | Lang | H04L 63/20 726/1 |
| 2015/0365314 A1* | 12/2015 | Hiscock | H04L 45/02 370/389 |
| 2016/0044062 A1 | 2/2016 | Tsuchitoi | H04W 12/086 726/1 |
| 2016/0212166 A1* | 7/2016 | Henry | G06F 21/604 |
| 2016/0212167 A1* | 7/2016 | Dotan | G06F 3/04847 |
| 2016/0212170 A1* | 7/2016 | Martherus | H04L 63/20 |
| 2016/0219081 A1* | 7/2016 | Kruse | G06F 11/004 |
| 2016/0308908 A1* | 10/2016 | Kirby | G06F 21/604 |
| 2016/0344743 A1* | 11/2016 | Dotan | G06F 16/9535 |
| 2016/0344773 A1* | 11/2016 | Knjazihhin | G06F 21/604 |
| 2017/0013017 A1* | 1/2017 | Chen | G06F 21/554 |
| 2017/0048253 A1* | 2/2017 | Anton | H04L 63/20 |
| 2017/0048263 A1* | 2/2017 | Chen | H04L 63/1425 |
| 2017/0054757 A1* | 2/2017 | Siswick | H04L 63/102 |
| 2017/0214717 A1* | 7/2017 | Bush | G05B 19/0426 |
| 2017/0230422 A1* | 8/2017 | Shimizu | H04L 63/10 |
| 2017/0310666 A1* | 10/2017 | Six | H04L 63/104 |
| 2017/0323089 A1* | 11/2017 | Duggal | G06F 21/126 |
| 2017/0339187 A1* | 11/2017 | Papamartzivanos | H04L 63/1425 |
| 2018/0034920 A1* | 2/2018 | Gopalan | G06N 3/006 |
| 2018/0069899 A1* | 3/2018 | Lang | G06F 8/38 |
| 2018/0316676 A1* | 11/2018 | Gilpin | H04L 9/0891 |
| 2018/0324216 A1* | 11/2018 | Cross | G06F 21/10 |
| 2018/0367563 A1* | 12/2018 | Pfleger de Aguiar | G06F 21/577 |
| 2019/0057170 A1* | 2/2019 | Burriesci | G05B 17/02 |
| 2019/0058734 A1* | 2/2019 | Xu | H04L 63/062 |
| 2019/0079744 A1* | 3/2019 | Bosch | G06F 8/60 |
| 2019/0104026 A1* | 4/2019 | Zhang | H04L 41/20 |
| 2019/0173898 A1* | 6/2019 | Bharrat | H04L 63/1425 |
| 2019/0182103 A1* | 6/2019 | Pignataro | H04L 41/16 |
| 2019/0182119 A1* | 6/2019 | Ratkovic | G06F 16/2379 |
| 2019/0199752 A1* | 6/2019 | Gandhi | H04L 63/101 |
| 2019/0342340 A1* | 11/2019 | Leap | H04L 41/0893 |
| 2019/0349391 A1* | 11/2019 | Elsner | H04L 63/20 |
| 2019/0384863 A1* | 12/2019 | Sirin | G06K 9/6262 |
| 2020/0007397 A1* | 1/2020 | Fainberg | H04L 41/145 |
| 2020/0028870 A1* | 1/2020 | Dell'Era | H04L 43/10 |
| 2020/0053190 A1* | 2/2020 | Uddin | H04L 69/18 |
| 2020/0073971 A1* | 3/2020 | Elliott | H04L 43/045 |
| 2020/0092313 A1* | 3/2020 | Yamaguchi | H04L 63/0254 |
| 2020/0099721 A1* | 3/2020 | Golan | H04L 63/145 |
| 2020/0104426 A1* | 4/2020 | Wu | G06N 20/00 |
| 2021/0051182 A1* | 2/2021 | Milton | H04L 63/0892 |

\* cited by examiner

AUTOMATED DISCOVERY OF SECURITY POLICY FROM DESIGN DATA

BACKGROUND

The subject matter disclosed herein relates generally to industrial automation systems, and, more particularly, to implementation of security policies in an industrial environment.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for configuring security in an industrial environment is provided, comprising a design data discovery component configured to read design data from one or more industrial control project development platforms, wherein the design data is generated in connection with design of an industrial control system; a model builder component configured to identify devices of the industrial control system, physical network connections between the devices, and communication paths between pairs of the devices based on analysis of the design data, and to generate model data representing the devices, the physical network connections, and the communication paths; a policy translation component configured to translate the model data to security rules defining permitted network communications between pairs of the devices, and to generate one or more security policies directed to respective one or more of the devices based on the security rules; and a device interface component configured to send the one or more security policies to the one or more of the devices, and wherein the security policies configure the one or more of the devices to implement a network security policy defined by the security rules.

Also, according to one or more embodiments, a method for configuring network security in an industrial environment is provided, comprising reading, by a system comprising a processor, design data relating to an industrial automation system, wherein the design data is generated by an industrial control project development platform; identifying, by the system based on an analysis of the design data, devices of the industrial automation system; identifying, by the system based on the analysis of the design data, physical network connections between the devices; identifying, by the system based on the analysis of the design data, communication paths between pairs of the devices based on analysis of the design data; generating, by the system, model data representing the devices, the physical network connections, and the communication paths; generating, by the system, security rules based on the model data, wherein the security rules define permitted network communications between pairs of the devices; generating, by the system based on the security rules, one or more security policies that, in response to execution by respective one or more of the devices, cause the respective one or more of the devices to enforce the security rules; and sending, by the system, the one or more security policies to the one or more of the devices.

Also, a non-transitory computer-readable medium is provided having stored thereon executable instructions that, in response to execution, cause a computer system comprising at least one processor to perform operations, the operations comprising reading design data relating to an industrial automation system, wherein the design data is generated by an industrial control project development platform; identifying, based on an analysis of the design data, devices of the industrial automation system, physical network connections between the devices, and communication paths between pairs of the devices based on analysis of the design data; generating model data representing the devices, the physical network connections, and the communication paths; generating security rules based on the model data, wherein the security rules define permitted network communications between pairs of the devices; generating, based on the security rules, one or more security policies that, in response to execution by respective one or more of the devices, cause the respective one or more of the devices to enforce the security rules; and sending the one or more security policies to the one or more of the devices.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
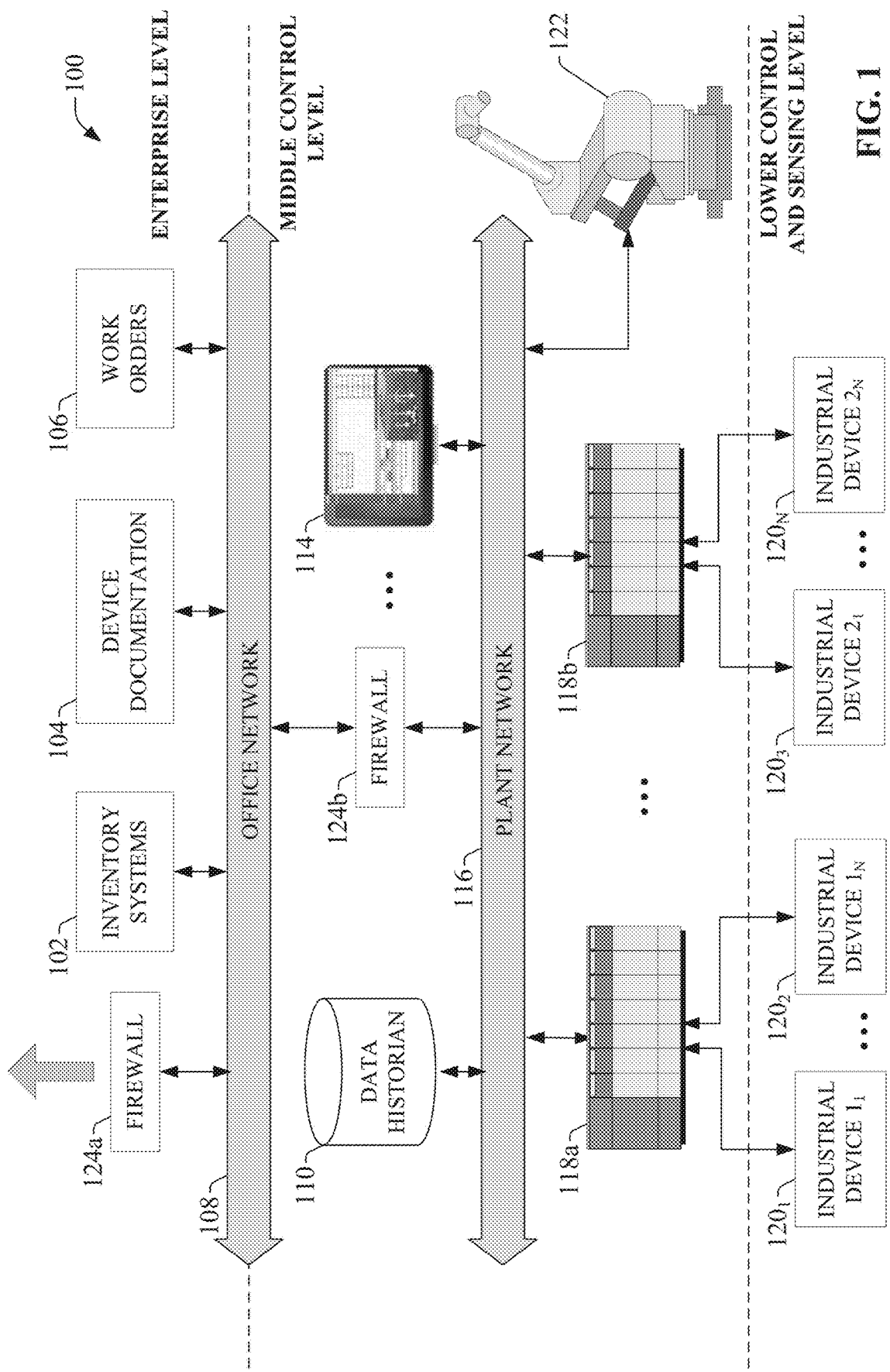
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example industrial control environment 100, including a number of diverse industrial devices and assets. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial systems. One or more industrial controllers 118 may also comprise a soft controller executed on a personal computer or other hardware platform, or a hybrid device that combines controller functionality with other functions (e.g., visualization). The control programs executed by industrial controllers 118 can comprise any conceivable type of code used to process input signals read from the industrial devices 120 and to control output signals generated by the industrial controllers, including but not limited to ladder logic, sequential function charts, function block diagrams, or structured text.

Industrial devices 120 may include both input devices that provide data relating to the controlled industrial systems to the industrial controllers 118, and output devices that respond to control signals generated by the industrial controllers 118 to control aspects of the industrial systems. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices, robot control inputs, valves, and the like.

Industrial controllers 118 may communicatively interface with industrial devices 120 over hardwired or networked connections. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over a network using, for example, a communication module or an integrated networking port. Exemplary networks can include the Internet, intranets, Ethernet, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.).

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer.

Other industrial devices or assets can include industrial robots 122, which may operate in accordance with programs executed by their own internal controllers, in conjunction with information exchanged with one or more external controllers (e.g., controllers 118). Some industrial environments may also include a number of sub-systems that perform various production, quality, or safety functions, including but not limited to vision systems, safety systems (e.g., optical presence sensing systems, safety relay systems, etc.), product quality check systems (e.g., leak test systems), or other such assets.

Some industrial environments may also include one or more data historians 110 that aggregate and store production information collected from the industrial controllers 118 or other data sources, or a device documentation store 104 containing electronic documentation for the various industrial devices making up the controlled industrial systems. Other industrial devices or assets may include inventory tracking systems 102, work order management systems 106, or other such systems, some or all of which may reside on an office network 108 of the industrial environment (e.g., a separately managed network relative to plant network 116). The industrial network environment may also include a number of network architecture devices—such as firewall 124, hubs, routers, or switches—that connect separate networks and/or networked devices and manage data flow between the various devices and networks.

Since so many industrial devices, systems, and assets reside on plant and/or office networks, system designers must often configure network security features that prevent unauthorized access to the industrial assets by unauthorized users or devices, or that detect abnormal data traffic patterns that may be indicative of an malicious device reconfiguration or unauthorized access to sensitive information. Such security measures are required to prevent unauthorized viewing of production data or other sensitive information, to prevent reconfiguration of industrial devices by unauthorized entities, or to prevent remote entities from assuming control of the industrial assets and modifying control sequences or device parameters. Configuring security for industrial assets may include, for example, defining access permissions for respective industrial assets (e.g., specifying which other devices or personnel may access a given industrial asset), configuring digital certificates or key-based security for secure data exchange between devices, assigning Internet Protocol (IP) addresses to respective devices, defining network workgroups, configuring firewall parameters to filter access to devices and systems on a plant or office network, defining expected data traffic patterns on specified network segments that can be used as a baseline for abnormal data flow detection, configuring whitelists explicitly defining which devices are permitted to exchange data with a given asset, or other such configuration actions.

Typically, setting up security for an industrial automation environment requires a user to manually configure security parameters and definitions for a large number of separate devices individually. This can be a time-consuming process in an industrial environment comprising a large number of industrial assets and network infrastructure devices. Moreover, configuring these industrial assets for security often requires specialized knowledge of the individual devices being configured, thereby limiting the number of personnel qualified to configure and manage security settings for an industrial environment.

Also, since security parameters and policies for the respective devices must be configured manually for each device individually, the process of defining security policies for a given industrial automation system is prone to human error, and the resulting security policies may be incomplete or inaccurate relative to the needs of the particular automation system. Such errors or omissions in security policy definitions may result in security vulnerabilities, or may block necessary communication channels between devices that require a reliable channel for data exchange. Because of the difficulties and time involved in designing and implementing industrial security, system designers often limit security configurations to a simple set of crude security rules, which may result in sub-optimal or incomplete security configurations. Incomplete security configurations can leave aspects of the industrial systems vulnerable to security violations, while sub-optimal security configurations can result in operational inefficiencies or maintenance difficulties.

To address these and other issues, one or more embodiments of the present disclosure relate to an industrial security policy configuration system capable of generating and implementing security policies for industrial automation systems based on existing design data for the industrial systems generated by various industrial design and programming platforms. In one or more embodiments, the security policy configuration system can discover and retrieve design data from one or more sources, including but not limited to industrial controller program files, controller configuration data (e.g., controller I/O configuration data and communication settings), configuration data for motor drives or other devices that make up the industrial system (e.g., motor drives, HMIs, etc.), network architecture data, hardware diagrams, or other sources of design data. The design data typically includes data generated by device manufacturers, system integrators, original equipment manufacturers (OEMs), or the owners of the industrial assets during the design of the industrial systems.

The security policy configuration system translates the collected design data to a security rule set defining device-level communication privileges. The system then translates this security rule set to a comprehensive set of security policies customized to the requirements of the industrial systems represented by the design data. The security policies can define, for example, valid outbound and inbound connections, valid routing of communication paths through intermediate network devices, authoritative policy sources, users or user roles permitted to perform specified actions, definitions of security zones and identities of the devices that participate in each zone, or other such security policy aspects.

The security policy configuration system can translate the defined security policies into device-specific security configuration instructions that are then downloaded or otherwise sent to the appropriate devices (e.g., industrial controllers, HMIs, I/O modules, network infrastructure devices, motor drives, and/or industrial devices) in order to implement the defined security policies. In some embodiments, this translation can be based on defined translation rules maintained by the configuration system. These translation rules can include vendor-specific rules capable of generating appropriate security configuration instructions for respective vendor-specific devices.

Figure 2:
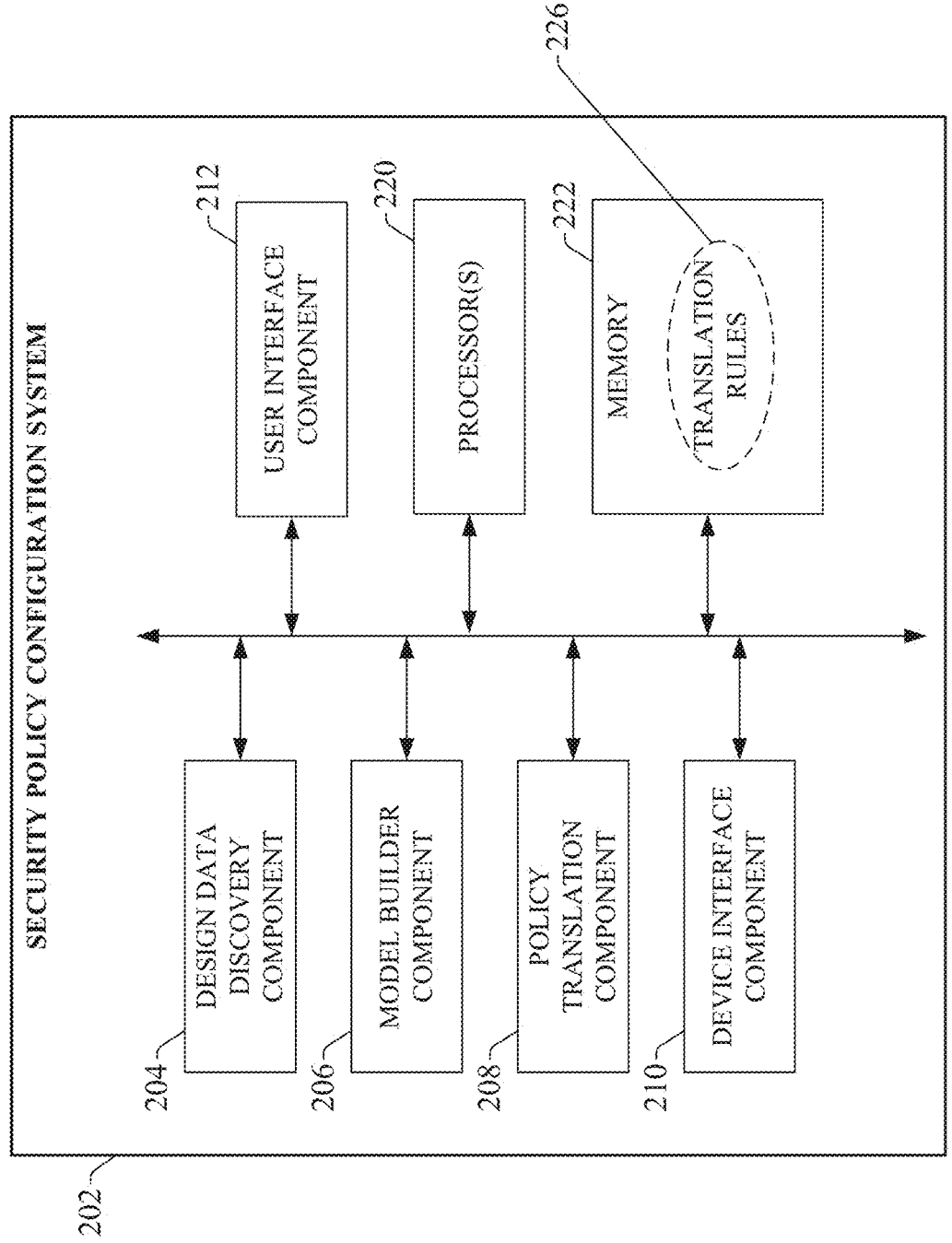
FIG. 2 is a block diagram of an example security policy configuration system.

FIG. 2 is a block diagram of an example security policy configuration system 202 according to one or more embodiments of this disclosure. Aspects of the systems, apparatuses, or processes explained in this disclosure can constitute machine-executable components embodied within machine (s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Security policy configuration system 202 can include a design data discovery component 204, a model builder component 206, a policy translation component 208, a device interface component 210, a user interface component 212, one or more processors 220, and memory 222. In various embodiments, one or more of the design data discovery component 204, model builder component 206, policy translation component 208, device interface component 210, user interface component 212, the one or more processors 220, and memory 222 can be electrically and/or communicatively coupled to one another to perform one or more of the functions of the security policy configuration system 202. In some embodiments, components 204, 206, 208, 210, and 212 can comprise software instructions stored on memory 222 and executed by processor(s) 220. Security policy configuration system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

Design data discovery component 204 can be configured to retrieve design data relating to design and configuration of one or more industrial automation systems. Example types of design data that can be read by data discovery component 204 can include, but is not limited to, industrial controller programming and configuration data retrieved from a controller programming application (e.g., ladder logic programming and associated controller configuration data that is to be downloaded to an industrial controller for execution), I/O module configuration data, HMI configuration data retrieved from an HMI development application, motor drive configuration data, configuration data for other types of industrial devices, network device configuration data, information retrieved from hardware diagram, and other such information.

Model builder component 206 can be configured to generate, based on the design data, an annotated nodal diagram representing network connections between devices that make up the industrial automation system, as well as permitted device-to-device communication paths or patterns between devices. Policy translation component 208 can be configured to generate security rule data based on the annotated nodal diagram, where the security rule data defines a set of security rules inferred by the system 202 based on analysis of the nodal diagram. Policy translation component 208 is also configured to translate these security rules to executable security policy data or instructions that, when implemented on respective industrial and/or networking devices, enforce the security rules generated by the system 202. In some embodiments, policy translation component 208 can translate the security rules to vendor-specific and model-specific security configuration instructions based on translation rules 226 stored on memory 222, which can define appropriate configuration instruction formats or available security settings for devices of various types and vendors.

Device interface component 210 can be configured to exchange data between the security policy configuration system 202 and devices on a plant and/or office network. This can include, for example, sending the executable security policy data or instructions to the devices, polling the devices for confirmation that the security policies have been implemented, polling for device identification and configuration information, etc.

User interface component 212 can be configured to generate a set of graphical user interface displays with which a user can interact in order to view the annotated nodal diagram, view the security rules generated by the configuration system 202, modify aspects of the security rules prior to implementation (e.g., modifying communication permissives, modifying user authorizations, re-defining security zones, re-assigning industrial and networking devices to different security zones, etc.), or perform other interactions with the system 202.

The one or more processors 220 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Figure 3:
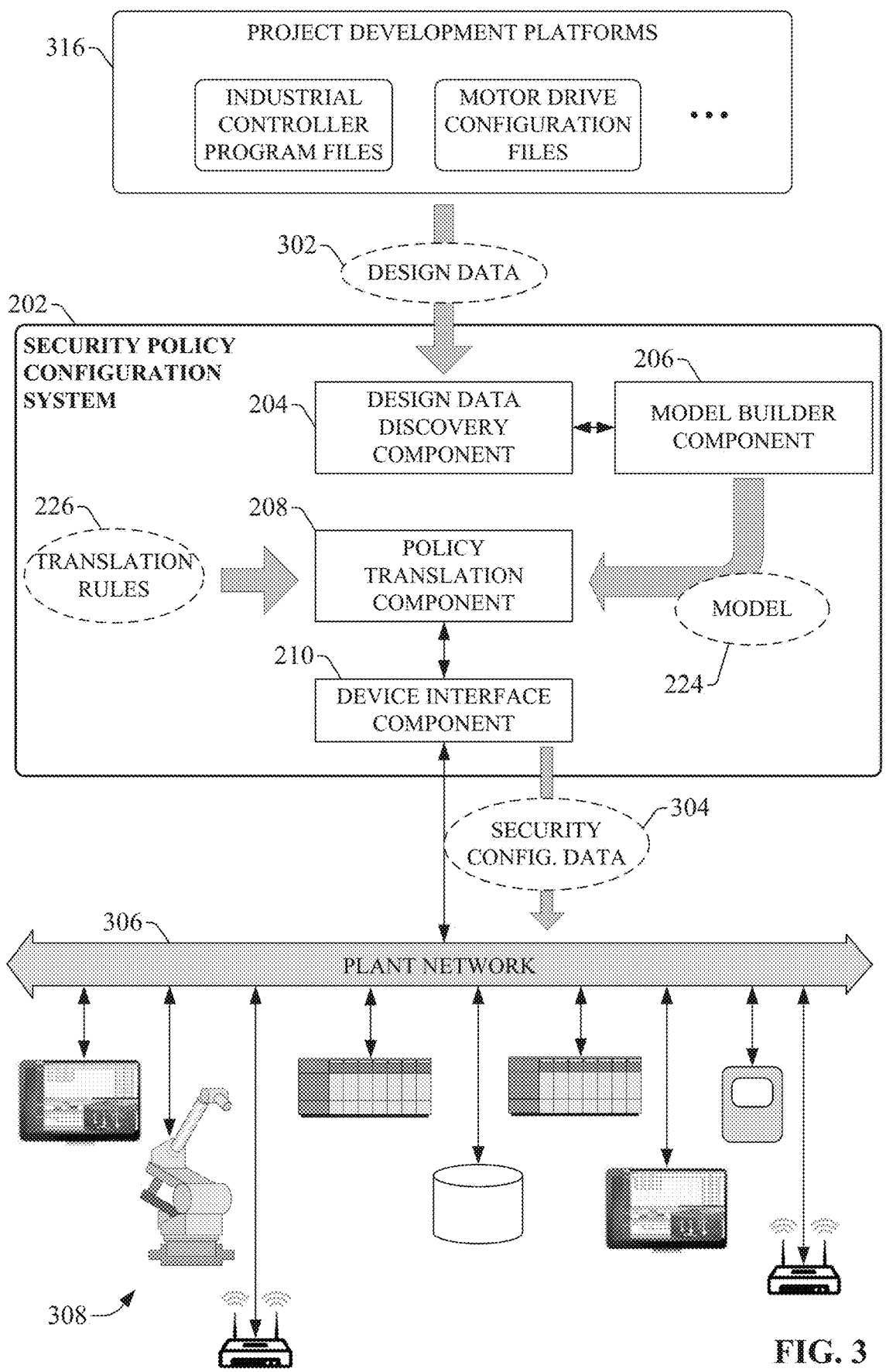
FIG. 3 is a diagram of an example system architecture that includes a security policy configuration system for configuration of plant-wide device security policies.

The industrial security configuration system 202 described herein can automatically create a set of security rules or policies for a collection of networked industrial assets that make up one or more industrial automation systems. The system 202 then uses this security model to generate comprehensive device-specific security configuration instructions and set device security parameters for individual devices on the network to implement the security policies. FIG. 3 is a diagram of an example system architecture that includes a security policy configuration system 202 for configuration of plant-wide device security policies. In the illustrated example, a plant environment comprises a number of industrial devices and assets 308 residing on a plant network 306. Plant network 306 may conform to any suitable networking protocol or combination of protocols, including but not limited to Ethernet, Ethernet/IP, DeviceNet, ControlNet, Data Highway and Data Highway Plus (DH/DH+), Remote I/O, Fieldbus, Modbus, Profibus, wireless networks, serial protocols, etc. The industrial assets 308 may comprise, for example, PLCs or other types of industrial controllers, motor drives (e.g., variable frequency drives), vision systems, safety relays, human-machine interface terminals, industrial robot controllers, data historians, work order tracking systems, or other such industrial assets. Industrial assets 308 can also include the network infrastructure devices (e.g., routers, hubs, switches, firewalls, etc.) that make up the backbone of the plant network 306 and which manage data transfer and security between network devices and network segments.

Design data discovery component 204 is configured to read and retrieve design data 302 from one or more project development platforms 316 used to design, configure, and/or program one or more of the industrial assets 308. Project development platforms 316 can include, but are not limited to, industrial controller configuration and programming applications used to develop ladder logic programs or other types of industrial controller programs, as well as associated industrial controller configuration settings (e.g., controller communication settings, definition of I/O modules associated with the industrial controller and their respective I/O settings, etc.). Project development platforms 316 from which design data discovery component 204 can retrieve design data 302 can also include HMI development applications used to develop HMI applications for execution on HMI terminals (where the HMI applications define the graphical displays rendered by the HMI and their interactive features), configuration applications used to configure motor drives, safety relays, or other types of industrial devices, or other such industrial design development applications. In some scenarios, design data discovery component 204 may retrieve different types of design data 302 (e.g., industrial controller programming files, HMI project files, drive configuration data, etc.) from respective different development platforms 316. In other scenarios, some project development platforms 316 may support integrated design of multiple aspects of an industrial automation system (e.g., platforms that support simultaneous or parallel development of both industrial controller programs and HMI applications, and possibly other aspects of the control system). In such cases, design data discovery component 204 can retrieve multiple sets of design data 302 from this single development platform 316.

In some embodiments in which security policy configuration system 202 is a separate system relative to project development platforms 316, configuration system 202 can be configured to communicatively connect to the respective project development platforms 316—e.g., via a direct or networked connection—in order to discover and retrieve the design data 302. Alternatively, some embodiments of configuration system 202 may be an integrated subsystem of a project development platform 316 (e.g., an integrated security tool of an industrial controller programming application or another type of development platform). In such embodiments, configuration system 202 can access the design data 302 via the shared development platform and generate security configuration data in parallel with design and development of the automation system.

Figure 4:
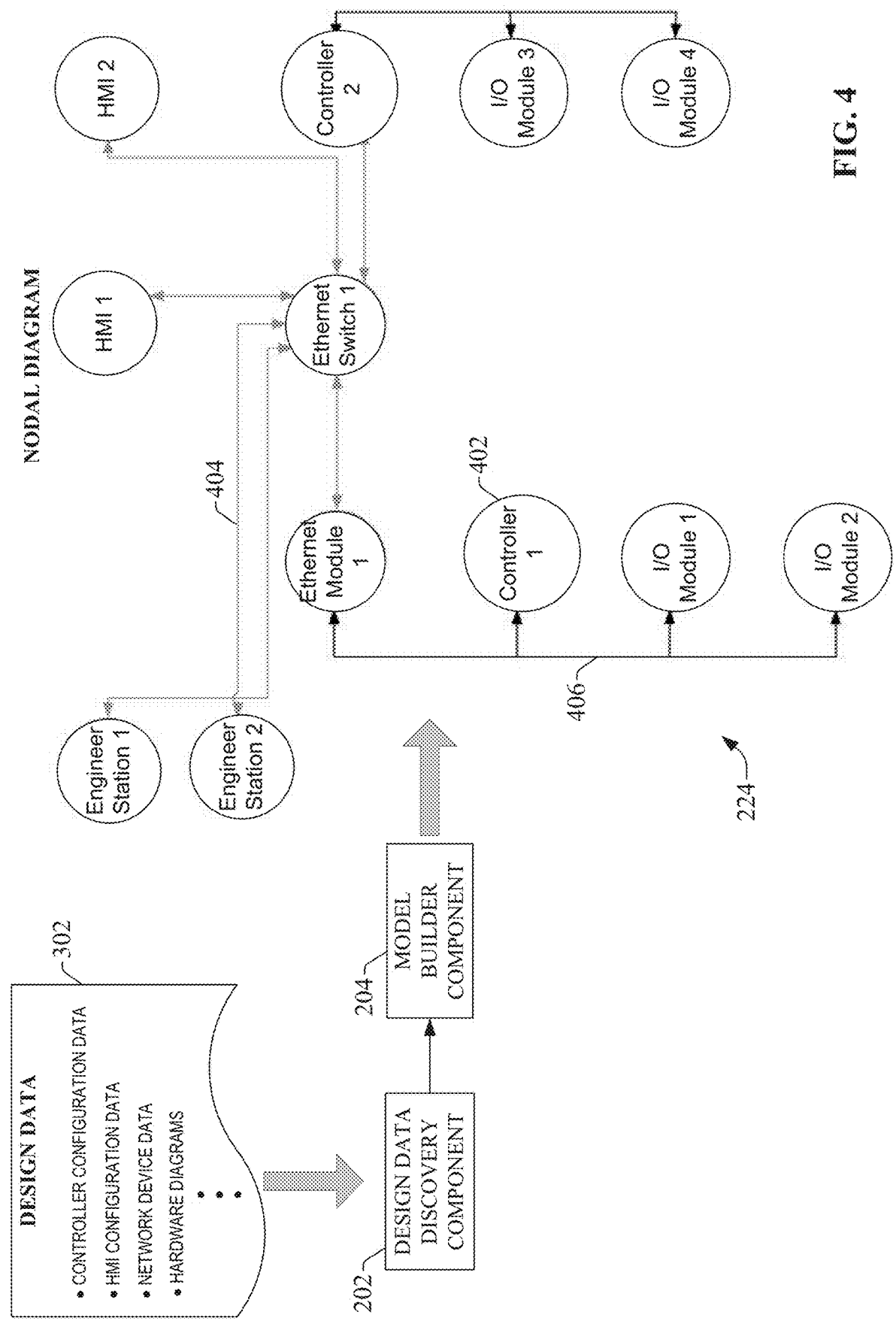
FIG. 4 is a diagram illustrating generation of model data by model builder component.

Based on information obtained from the design data 302, model builder component 206 can generate model data 224 that models the collection of industrial assets 308, the physical network connections between the assets 308, and the communication paths defined between the assets 308, all of which are identified or inferred from the design data 302. FIG. 4 is a diagram illustrating generation of example model data 224 by model builder component 206. In one or more embodiments, model data 224 can be formatted as a nodal diagram of the one or more industrial automation systems represented by design data 302. Each node 402 of the nodal diagram represents a device of the automation system, and the arrows connecting the nodes 402 represent physical network pathways between the devices.

In the illustrated example, the arrows are classified into two types of connections—ethernet network connections represented by the lighter arrows 404, and backplane or remote I/O connections between controllers and their respective I/O, networking, or special function modules represented by the darker arrows 406. As illustrated in FIG. 4, the example automation system represented by design data 302 comprises two industrial controllers represented by the Controller 1 and Controller 2 nodes, respectively. Controller 1 has two associated I/O modules—represented by the I/O Module 1 and I/O Module 2 nodes—as well as an associated ethernet module represented by the Ethernet Module 1 node. Controller 2 has two associated I/O modules represented by the I/O Module 3 and I/O Module 4 nodes. Both controllers are networked to an ethernet switch represented by the Ethernet Switch 1 node. Controller 2 has an integrated ethernet port and so is directly connected to the Ethernet Switch 1. Controller 1 is connected to Ethernet Switch 1 via its ethernet module. The automation system also includes two HMIs—represented by the HMI 1 and HMI 2 nodes—networked to the controllers via Ethernet Switch 1. Two engineering stations—Engineering Station 1 and Engineering Station 2—are also connected to Ethernet Switch 1.

Figure 5:
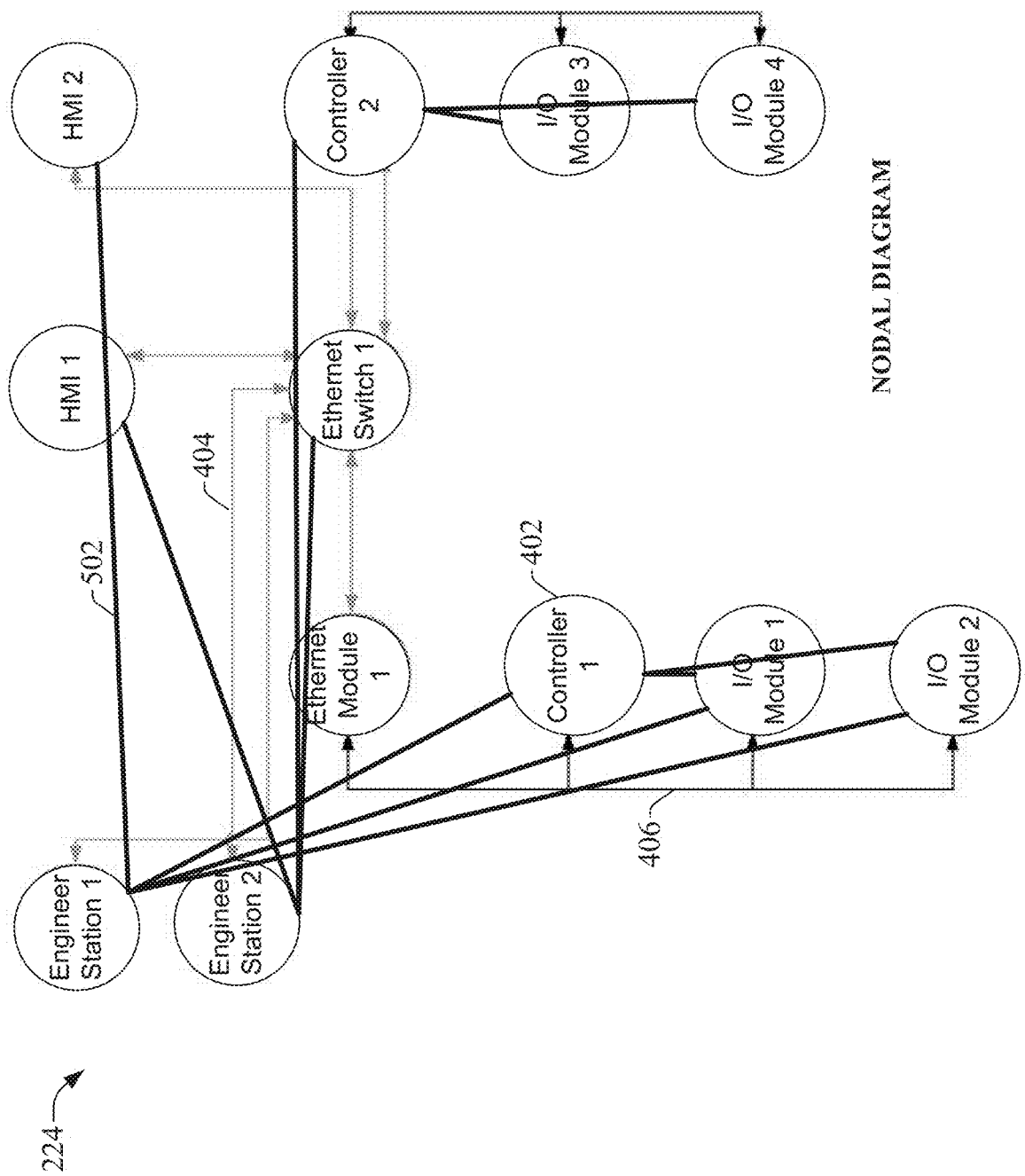
FIG. 5 is a representation of the nodal diagram represented by model data including communication paths between industrial devices.

Although the example nodal diagram depicted in FIG. 5 includes only industrial controllers, their associated I/O modules, HMIs, and engineering stations, other types of industrial devices, and the communication paths therebetween, can also be discovered by the model builder component 206 and included in the nodal diagram, including but not limited to motor drives (e.g., variable frequency drives or other types of drives), circuit breakers, telemetry devices such as sensors or meters, safety relays and their associated safety input devices, vision systems or other types of quality check systems, or other such devices.

Model builder component 206 determines the identities of the devices and the network connections between the devices based on configuration information obtained from the design data 302. For example, based on information obtained from each of the controllers' I/O configuration settings, model builder component 206 can identify the models of the controllers as well as the the I/O modules, networking modules, and special function modules defined as being connected to each controller. HMI configuration data or files can be leveraged by the model builder component 206 to identify the HMIs connected to the automation system. Model builder component 206 can also determine network connections to the ethernet switch based on hardware diagram information, network device configuration information, or other relevant network design information obtained from the design data 302.

Once the devices that make up the automation system and the network connections between the devices have been identified and recorded in model data 224, model builder component 206 identifies communication paths or channels between the devices based on further analysis of the design data 302, and annotates model data 224 to include these communication paths. FIG. 5 is a representation of the nodal diagram represented by model data 224 including the communication paths 502 between the devices. In the illustrated example, the communication paths 502 are represented by the thick lines, each of which connects two nodes representing the two end devices of the communication path. Each communication path 502 defines a required or permitted point-to-point communication channel between two end devices, as determined from the design data 302. Although the nodal diagram depicts each communication path 502 as a direct line between two device nodes, the actual channel of communication represented by the path 502 may be routed through any intervening devices (e.g., Ethernet Switch 1, Ethernet Module 1, etc.) along the physical network path between the two end devices.

Communication paths 502 represent permitted inter-device communication channels that are defined—either explicitly or implicitly—by the system designer as part of the automation system design and recorded as part of design data 302. Model builder component 206 can identify at least some of these defined communication paths 502 based on communication configuration information obtained from a controller program file (e.g., a ladder logic file). For example, the I/O configuration information contained in a controller program file for an industrial controller can define the I/O modules that communicate with the controller via the controller's backplane (or via a remote I/O connection). Accordingly, model builder component 206 can read these I/O configuration settings from the respective controller program files (part of design data 302) and annotate the nodal diagram with these communication paths 502, which are represented in FIG. 5 by the thick lines between the controller and each of its associated I/O modules. The controller program files for each of the two controllers can also include ethernet configuration settings that define which devices each controller is to communicate with via the controllers' respective ethernet ports or ethernet modules. Model builder component 206 can read these network configuration settings for each controller to determine that Controller 1 has been configured to communicate with Engineering Station 1 via that controller's ethernet module, while Controller 2 has been designed to communicate with Engineering Station 2 via that controller's integrated ethernet port. These communication paths 502 are also annotated on the nodal diagram as thick lines between the controllers and their corresponding engineering stations.

Model builder component 206 can also examine the HMI configuration files or data that is included as part of design data 302 to determine which devices each of the two HMIs are configured to communicate with. In the illustrated example, HMI 1 is configured to communicate with Engineer Station 2, while HMI 2 is configured to communicate with Engineer Station 1, as determined by the model builder component 206 based on examination of the communication settings read from each HMI's configuration file. These communication paths 502 have also been added to the nodal diagram by model builder component 206. Model builder component 206 can also identify communication paths between an HMI and another device based on references to the other device defined in the HMI's configuration file (e.g., references to controller data tags whose values define an animation state of one of the HMI's graphical objects, which imply a permitted communication path between the HMI and the referenced controller).

Model builder component 206 can also be configured to identify permitted device-to-device communication paths based on other types of design data 302, including but not limited to the controller programming (e.g., ladder logic) itself and any global tags defined in the controller program file. For example, assuming an industrial controller programmed using ladder logic, the logic program may include a read or write instruction block that references a target device that is to be the object of the block's read or write command. Model builder component 206 can identify a read or write instruction in the ladder logic program, infer a communication path 502 between the controller and the target device referenced by the instruction, and annotate the model data 224 accordingly to include a communication path 502 between the controller and the target device. Similarly, global tags defined in the controller program file that reference devices external to the controller can be identified by the model builder component 206, which can infer a communication path between the controller and the referenced external device.

In some embodiments, model builder component 206 can also be configured to determine whether a given communication path 502 is to be bi-directional or a one-way communication path based on information about the communication channel inferred from the design data 302, and annotate the communication path 502 on the nodal diagram accordingly. Also, in some design scenarios the design data 302 may suggest that data traffic between two devices will always be initiated by only one of the two devices. For example, although a controller may be configured to engage in bi-directional communication with a given device, model builder component 206 may infer from the design data 302 that data sent from the device to the controller will only be in response to an explicit request for the data from the controller (e.g., when the controller polls the device for the requested data). Accordingly, the model builder component 206 may annotate this communication path to indicate that, although the communication path is bi-directional, data exchanges performed over this communication path are only permitted to be initiated by the controller, and that data may not be sent from the device to the controller unless requested by the controller.

In some embodiments, model builder component 206 can be also be configured to identify any user permissions defined by the system designer as part of design data 302, and annotate model data 224 to include these discovered user permissions. Such user permission can include restrictions on which personnel (or user roles) are permitted to view and/or modify data on specified devices of the automation system.

Returning now to FIG. 3, once model data 224 (representing the annotated nodal diagram) has been completed by the model builder component 206, the model data 224 is provided to policy translation component 208, which translates the model data 224 to a set of security rules, and further translates these security rules to device-specific sets of security configuration data 304. Device interface component 210 can then deliver the resulting security configuration data 304 to the appropriate industrial devices and assets in order to implement the security rules on the automation system devices.

Figure 6:
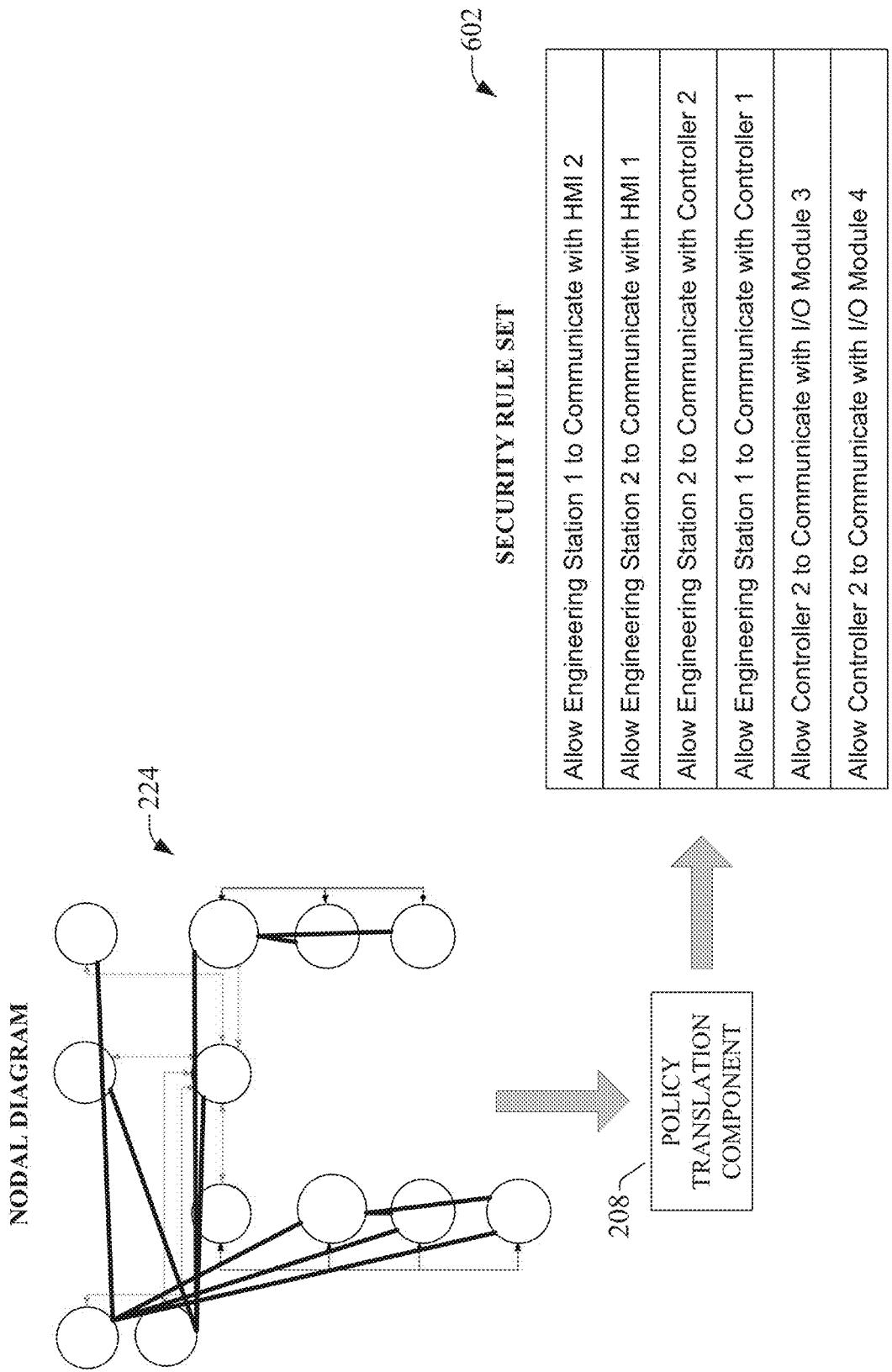
FIG. 6 is a diagram illustrating translation of model data defining the nodal diagram to a set of security rules.

FIG. 6 is a diagram illustrating translation of the model data 224 defining the nodal diagram to a set of security rules 602. The communication paths 502 of the annotated nodal diagram—defined by model data 224—represent permissible communication channels between specified devices as intended by the system designer. Based on the model data 224, policy translation component 208 can generate the set of security rules 602 to accord to the defined permissible communication paths 502. The set of security rules 602 define which devices are permitted to communicate with each other, and can be generated based on both the communication paths 502 as well as the physical network architecture (represented by arrows 404 and 406 of the annotated diagram).

A given security rule 602 can explicitly define two devices that are permitted to communicate with each other (e.g., "Allow Engineering Station 1 to communicate with HMI 2," "Allow Controller 2 to communicate with I/O Module 3," etc.), as determined by the communication paths 502 defined in the model data 224. In the case of communication paths 502 that have been annotated as one-way channels, the corresponding security rule 602 can specify that that communication from a first device to a second device is permitted, but communication from the second device to the first device is prohibited. Also, if a given bi-directional communication path defined by the model data 224 indicates that data traffic over this path may only be initiated by a specified one of the two devices associated with the path, policy translation component 208 can define the corresponding security rule 602 to indicate that the two devices are permitted to communicate only when initiated by the specified device. Other restrictions on a given communication path may also be specified by the security rules 602 in accordance with the annotated communication path definitions recorded in the model data 224.

Figure 7:
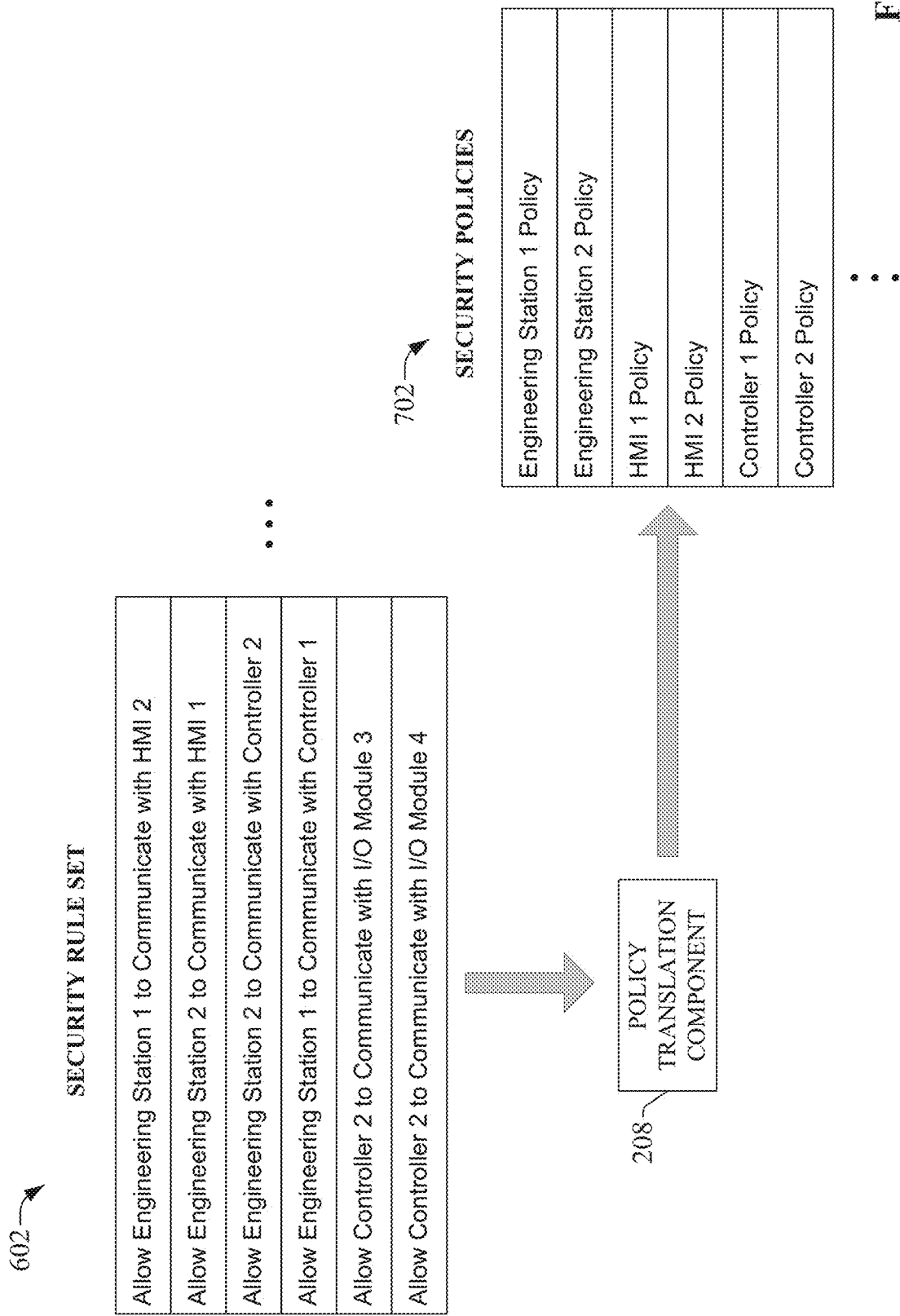
FIG. 7 is a diagram illustrating translation of security rules to a set of security policies.

Once the set of security rules 602 has been defined for the automation system, policy translation component 208 can translate this set of security rules 602 to a set of executable device-specific security policies that can be implemented on the devices that make up the automation system. FIG. 7 is a diagram illustrating translation of the security rules 602 to a set of security policies 702. In general, policy translation component 208 uses the set of security rules 602 as the basis for constructing individual device-specific security policies 702 that, when implemented on respective devices of the automation system, enforce the communication permissions defined by the security rules 602. Each security policy 702 can comprise one or more device-specific configuration instructions or security parameter setting in a format understandable by the target device. For example, a security policy 702 generated for HMI 1 can comprise configuration instructions or parameter settings for that HMI that, when implemented on HMI 1, configure the HMI's communication settings to operate in accordance with security rules 602. Policy translation component 208 generates such security policies 702 for any devices of the automation system whose security or communication settings must be modified in order to enforce the security strategy defined by security rules 602. If multiple sets of security rules 602 have been generated for respective different but related industrial automation systems that share common devices, policy translation component 208 can generate security policies 702 based on an aggregation of the security rule sets for the respective different automation systems, such that the resulting security policies 702 enforce all sets of security rules 602.

Example configuration actions that may be implemented on devices of the automation system by the security policies 702 can include modification of network addresses (e.g., IP addresses) or network address ranges on selected devices, enabling of specific security modes on selected devices, setting of valid inbound and outbound connections for respective devices, enabling of key-based or certificate-based security protocols in selected devices, distribution of encryption keys or certificates to devices to facilitate secure communication (e.g., if the devices are configured for key- or certificate-based security), updates of one or more whitelists that explicitly define devices that are permitted to communicate with the target device, modification of network router or switch settings, definition of an authoritative policy source, configuration of a group of devices to participate in a security zone, or other such actions. Policy translation component 208 can generate such security configuration instructions—in the form of security policies 702—for all necessary device-level security parameter changes required to implement the security strategy defined by the security rules 602. Since a given set of heterogeneous industrial assets may support different security technologies, the system 202 can implement the defined security strategy using more than one security enforcement technology for a given set of industrial and networking devices.

The security policies 702 generated by policy translation component 208 can take into consideration both the annotated communication paths 502 as well as the physical networking connections between devices defined by the model data 224 in connection with generating security policies 702. This ensures that intermediate network infrastructure devices along a given communication path are properly configured to enforce the security rules 602. As illustrated in the annotated nodal diagram depicted in FIG. 5, a direct connection between two devices of a given communication path 502 may not be available. Instead, such communication paths 502 must be routed between one or more intermediate devices. For example, the communication path 502 between Engineering Station 1 and HMI 2 must be routed through Ethernet Switch 1. Policy translation component 208 can be configured to analyze the physical network connections defined in the annotated nodal diagram in view of communication paths 502 to identify which communication paths 502 must be routed through one or more intermediate devices. Policy translation component 208 can then generate appropriate security policies 702 for these intermediate devices (e.g., network routers, hubs, switches, firewall devices, etc.) based on identifications of which communication paths 502 are expected to be routed through the intermediate devices.

If multiple possible paths are available for a given communication path 502, policy translation component 208 can be configured to select one of the available paths (that is, to select which set of intermediate devices are to be used to route the communication path) using any suitable selection criterion, and set the security policies 702 for these intermediate devices based on these selected paths. For example, if the security rules 602 dictate that a firewall configuration parameter on a firewall device must be modified (e.g., to either allow or block communication between two devices in accordance with the security rules 602), policy translation component 208 will generate, as a security policy 702 for the firewall device, a security configuration instruction formatted in accordance with the particular model of the firewall device, and designed to perform the necessary parameter modification on the firewall device.

In some embodiments, policy translation component 208 can also be configured to implement one or more of the security rules 602 by defining one or more security zones and assigning selected devices each of the security zones, if this is determined to be a suitable strategy for enforcing the security policy set forth by the security rules. A security zone comprises devices that are allowed to communicate with one another in a secure manner as part of normal operation of an automation system, and which share common security requirements. Devices outside a given security zone are typically prevented from communicating with devices within the security zone. Based on the composite security strategy defined by the security rules 602 and the configuration capabilities of the devices involved in the automation system, policy translation component 208 may configure one or more of the security policies 702 to assign selected devices of the automation system to a common security zone to permit communication between those selected devices while prohibiting communication between the security zone devices and devices outside the security zone.

To ensure that the device configuration instructions and parameter settings defined by each security policy 702 is properly formatted to be understood and executable by the target device to which the security policy is directed, even if the automation system comprises devices made by different device vendors, some embodiments of policy translation component 208 can be configured to reference translation rules 226 (see FIG. 3) that assist in properly translating the security rules 602 to model-specific and vendor-specific device configuration instructions. Translation rules 226 can include vendor-specific rules for generating security and/or network configuration instructions for respective vendor-specific industrial devices and network infrastructure devices. When a security policy 702 dictates that the security or network settings of a specific device will require modification, policy translation component 208 can identify the vendor and/or model of the device and reference a subset of the translation rules 226 corresponding to the identified vendor and/or model. The translation rules 226 may define, for example, the available security or communication settings available to be modified in the identified device, formatting requirements for device configuration instructions directed to the device, or other such information that can be leveraged by policy translation component 208 to ensure that the security policies 702 are understandable and executable by their respective target devices. In this way, the system 202 can hide or abstract from the user the technical complexities associated with setting device-level security parameters. The system 202 can also abstract the cross-vendor or cross-product differences in technology required to enforce the security policy.

Figure 8:
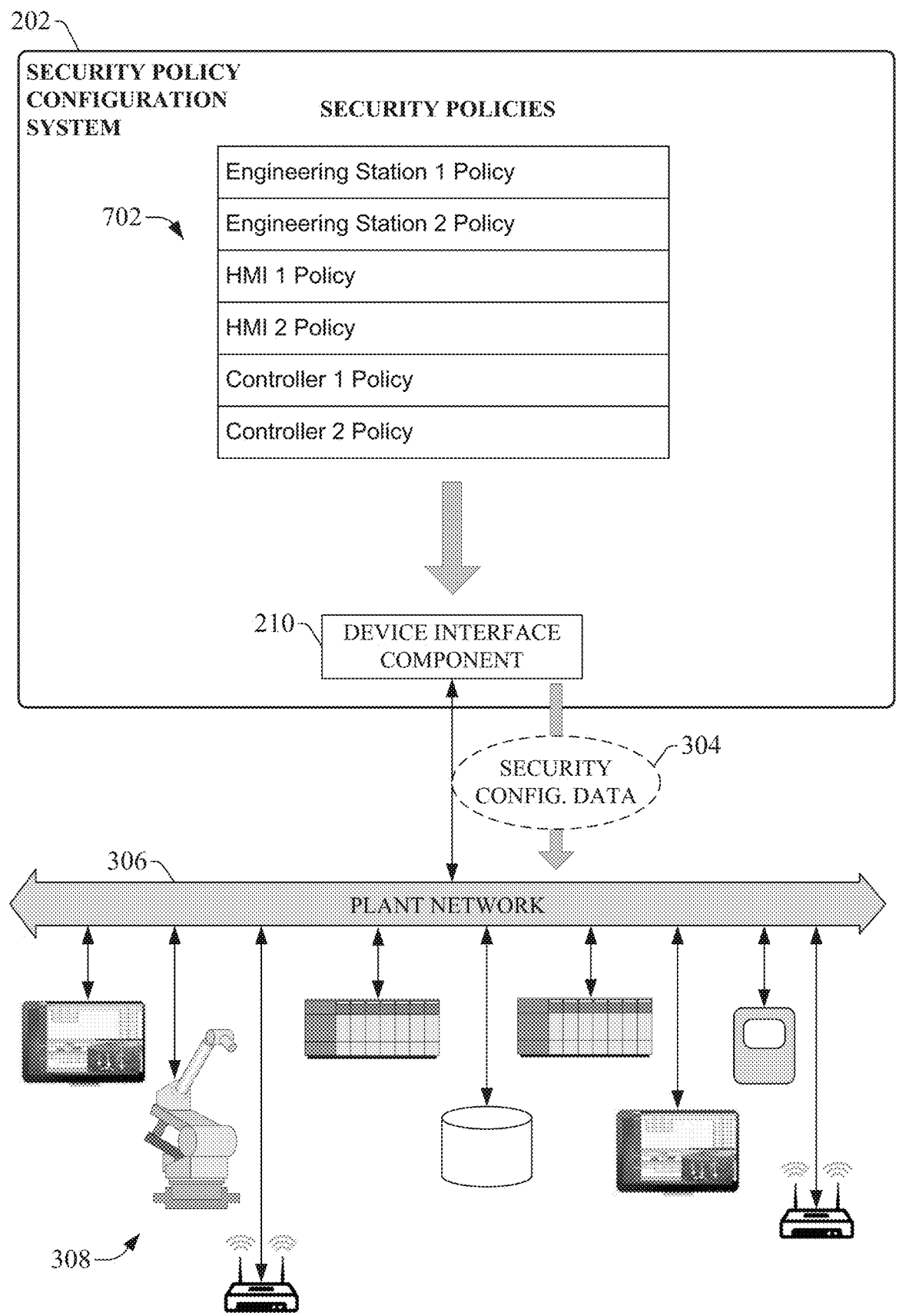
FIG. 8 is a diagram illustrating deployment of security policies to industrial assets that make up one or more industrial systems.

FIG. 8 is a diagram illustrating deployment of security policies 702 to the industrial assets 308 that make up one or more industrial systems. Once security policies 702 have been generated, device interface component 210 can deploy the security policies 720 as security configuration data 304 over the plant network 306 to respective industrial and network devices to implement the security strategy defined by the security rules 602. As noted above, each security policy 702 can be directed to, and formatted for execution on, a selected target device of the automation system (e.g., an industrial controller, an HMI terminal, a network switch or router, etc.). When sent to and executed on its target device, security configuration data 304 corresponding to that device's security policy 702 can implement security, networking, or communication configuration actions on the device, including but not limited to modifying the device's network address, defining valid inbound and outbound connections for the device, defining a whitelist of devices with which the device is permitted to communicate, enabling or disabling a selected security mode on the device, setting values of one or more selected security or communication parameters on the device, or other such configuration actions.

Although FIGS. 3 and 8 depict security policy configuration system 202 as residing on the plant network 306 with industrial assets 308 and deploying the security configuration data 304 to the assets 308 via the network 306, in some embodiments configuration system 202 may act as a stand-alone system that is not connected to the plant network 306. In such embodiments, the system may generate security policies 702 and convert these security policies 702 to security configuration data 304 as described above, and the user can deploy the security configuration data 304 to the respective devices by other means (e.g., by downloading the security configuration data 304 to the industrial devices via direct connections between the system 202 and the devices, or by copying the security configuration data to a flash drive and manually installing the security policies on the devices from the drive).

In some embodiments, user interface component 212 of the security policy configuration system 202 can be configured to interface the system 202 with a client device (e.g., a desktop, laptop, or tablet computer; a mobile personal device; etc.) and to deliver graphical interface displays to the client device that allow the user to view and interact with aspects of the system 202. For example, as the security policies for an automation system are being developed, user interface component 212 can be configured to generate a graphical representation of the nodal diagram represented by model data 224, allowing the user to visually confirm that the communication paths 502 identified by the system 202 are accurate. User interface component 212 can also allow the user to modify, remove, or add communication paths 502 if desired via interaction with the interface displays. Model builder component 206 can update the model data 224 to reflect any such modifications to the communication paths entered into the system 202 by the user, and policy translation component 208 will update the security rules and security policies accordingly.

By leveraging the range of design information generated during design and programming of an industrial control system, security policy configuration system 202 can generate a comprehensive and substantially optimal security configuration for the control system based on observations regarding how the control system was designed to operate, and in particular how the devices that make up the control system are designed to interact. This substantially automated, design-based approach can supplant less effective approaches whereby designers monitor network traffic after the control system has been installed, and develop security policies based on judgments regarding normal and abnormal network traffic. Such approaches are typically error-prone and can yield incomplete security policies due to reliance upon human judgment to identify abnormal network traffic (e.g., persistent data exfiltration) so that suitable security countermeasures can be configured. Security policy configuration system 202 can reduce reliance upon human judgment by automatically identifying expected normal network traffic based on the control system design, prior to installation of the control system, and generate a comprehensive set of security policies that facilitate permitted, expected network traffic while preventing abnormal or unexpected network activity.

Figure 9:
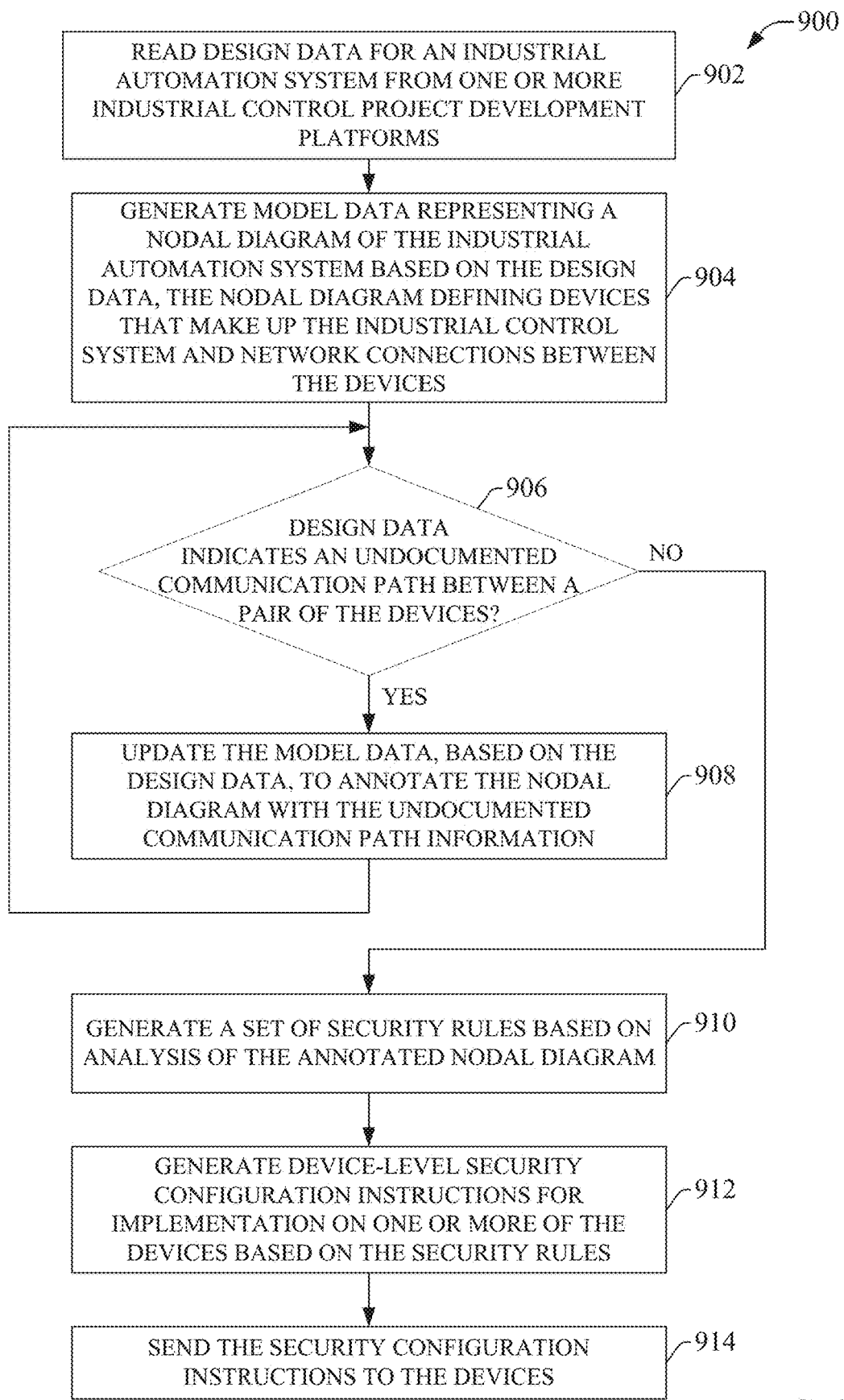
FIG. 9 is a flowchart of an example methodology for configuring and implementing a plant-wide security strategy based on diverse types of design data using a security policy configuration system.

FIG. 9 illustrates a methodology in accordance with one or more embodiments of the subject application. While, for purposes of simplicity of explanation, the methodology shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9 illustrates an example methodology 900 for configuring and implementing a plant-wide security strategy based on diverse types of design data using a security policy configuration system. Initially, at 902 design data for an industrial automaton system is read from one or more industrial control project development platforms. The platforms can be, for example, an industrial controller programming platform, an HMI application development platform, a device configuration tool (e.g., an application for configuring a motor drive or other types of industrial devices), or other such platforms. The design data itself can comprise, but is not limited to, industrial controller program files or data (e.g., ladder logic program files), HMI applications files, control system project files, device definition data, network architecture data, or other such information.

At 904, model data representing a nodal diagram of the industrial automation system is generated based on the design data read at step 902. The nodal diagram can define industrial and network devices that make up the industrial control system as well as the network connections between the devices. The device and network connectivity information included in the model data can be obtained or inferred by the system based on the design data.

At 906, a determination is made as to whether the design data indicates a communication path between a pair of the devices defined in the model data that has not yet been documented in the nodal diagram. Communication paths can be identified in or inferred from the design data based on such information as communication settings for the respective devices, controller programming instructions (e.g., read or write instructions that reference a target device), global tag information, network configuration settings, or other such information found in the design data. If the design data includes undocumented communication path, the methodology proceeds to step 908, where the model data is updated to annotate the nodal diagram with the undocumented communication path information. The methodology then returns to step 906, and a determination is made as to whether additional undocumented communication paths are found in the design data. Steps 906 and 908 repeat until all communication paths identified in the design data have been annotated in the model data.

At 910, a set of security rules are generated based on analysis of the annotated nodal diagram generated by iterations of steps 906 and 908. The security rules define communication permissions between sets of the devices. At 912, device-specific security instructions are generated based the security rules generated at step 910. The security instructions represent a set of security configurations to be implemented on respective devices of the industrial automation system in order to implement to overall security strategy represented by the security rules. In one or more embodiments, the system can reference translation rules that instruct the system how to convert one or more of the security rules into device- and vendor-specific security configuration instructions that, when executed on the individual target assets, will implement the overall security strategy defined by the security rules. These configuration instructions may comprise, for example, network address settings, whitelist entries, instructions to enable or disable selected device-level security features, security key or certificate information, messages specifying a certificate authority that should be used for secure communications, firewall device settings, or other such instructions. The translation rules can encode knowledge of the types and formats of security configuration instructions supported by a range of different device types and vendors, allowing the system to appropriately map the security policies defined by the security rules to a set of vendor- and model-specific device-level security configuration instructions that implement the defined security policy. At 914, the security configuration instructions are sent to the appropriate industrial assets on the plant floor (e.g., via the plant network).

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 10:
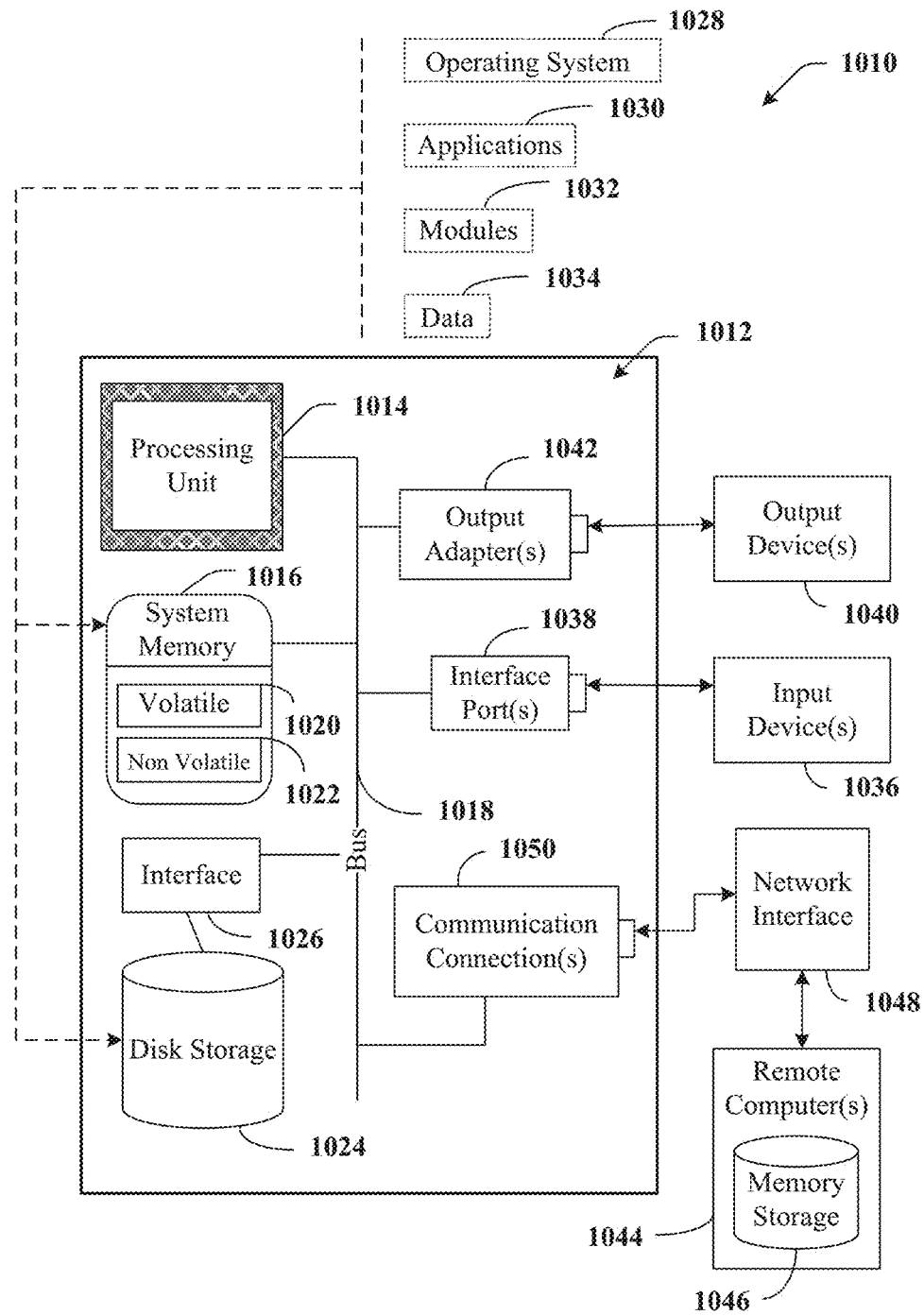
FIG. 10 is an example computing environment.
Figure 11:
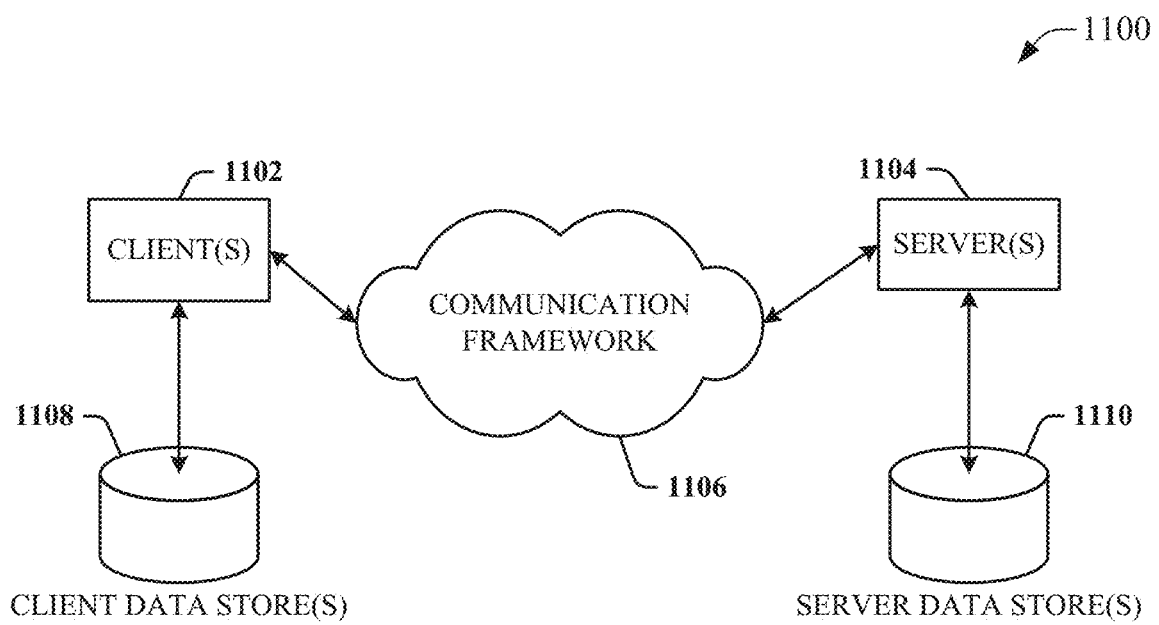
FIG. 11 is an example networking environment.

In order to provide a context for the various aspects of the disclosed subject matter, FIGS. 10 and 11 as well as the following discussion are intended to provide a brief, general description of a suitable environment in which the various aspects of the disclosed subject matter may be implemented.

With reference to FIG. 10, an example environment 1010 for implementing various aspects of the aforementioned subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable PROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 1048 can also encompass near field communication (NFC) or Bluetooth communication.

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for configuring security in an industrial environment, comprising:
    a memory that stores executable components;
    one or more processors, operatively coupled to the memory, that execute the executable components, the executable components comprising:
        a design data discovery component configured to read design data from one or more industrial control project development platforms, wherein the design data is generated in connection with design of an industrial control system;
        a model builder component configured to identify devices of the industrial control system, physical network connections between the devices, and communication paths between pairs of the devices based on analysis of the design data, and to generate model data representing the devices, the physical network connections, and the communication paths;
        a policy translation component configured to:
            translate the model data to security rules consisting of permitted network communications between pairs of the devices, and
            translate the security rules to device-specific configuration instructions or security parameter settings in a format executable by respective devices; and
        a device interface component configured to send the device-specific configuration instructions or security parameter settings to the respective devices to implement a network security policy defined by the security rules.

2. The system of claim 1, wherein the design data comprises at least one of an industrial controller program file, controller I/O configuration data, a human-machine interface application, configuration data for an industrial device, hardware diagram data, or network architecture design data.

3. The system of claim 1, wherein the model builder component is configured to identify the communication paths based at least on a subset of the design data comprising I/O module configuration data of an industrial controller, a read instruction of an industrial controller program, a write instruction of the industrial controller program, a global tag defined for the industrial controller, or communication setting data of one or more of the devices.

4. The system of claim 1, wherein the model builder component is configured to identify, based on the design data, whether a communication path is a bi-directional communication path or a one-way communication path, and to record in the model data whether the communication path is the bi-directional communication path or the one-way communication path.

5. The system of claim 1, wherein the device-specific configuration instructions or security parameter settings are executed on the respective devices to implement the network security policy defined by the security rules.

6. The system of claim 5, wherein the device-specific configuration instructions or security parameter settings comprise at least one of a network address, a security zone participation setting, a security mode setting, a setting specifying a valid inbound connection, a setting specifying a valid outbound connection, enablement of a key-based or certificate-based security protocol, a whitelist identifying devices with which communication is permitted, a network router setting, a network switch setting, or identity of an authoritative policy source.

7. The system of claim 1, further comprising a user interface component configured to render, on a graphical display interface, a nodal diagram representing the model data, wherein the nodal diagram comprises nodes representing the devices and lines between the nodes representing the physical network connections and the communication paths.

8. The system of claim 7, wherein
the user interface component is further configured to receive, via interaction with the graphical display interface, modifications to at least one of the communication paths, and
the model builder component is configured to update the model data in accordance with the modification.

9. The system of claim 1, wherein the security rules comprise communication restrictions indicating that communications between two devices are permitted when initiate by a specific device.

10. A method for configuring network security in an industrial environment, comprising:
reading, by a system comprising a processor, design data relating to an industrial automation system, wherein the design data is generated by an industrial control project development platform;
identifying, by the system based on an analysis of the design data, devices of the industrial automation system;
identifying, by the system based on the analysis of the design data, physical network connections between the devices;
identifying, by the system based on the analysis of the design data, communication paths between pairs of the devices based on analysis of the design data;
generating, by the system, model data representing the devices, the physical network connections, and the communication paths;
generating, by the system, security rules based on the model data, wherein the security rules consist of permitted network communications between pairs of the devices;
translating, by the system, the security rules to device-specific configuration instructions or security parameter settings in a format executable by respective devices;
sending, by the system, the device-specific configuration instructions or security parameter settings to the respective devices.

11. The method of claim 10, wherein the reading the design data comprises reading at least one of an industrial controller program file, controller I/O configuration data, a human-machine interface application, configuration data for an industrial device, hardware diagram data, or network architecture design data.

12. The method of claim 10, wherein the identifying the communication paths comprises identifying the communication paths based on I/O module configuration data of an industrial controller, a read instruction of an industrial controller program, a write instruction of the industrial controller program, a global tag defined for the industrial controller, or communication setting data of one or more of the devices.

13. The method of claim 10, further comprising executing the device-specific configuration instructions or security parameter settings on the respective devices to implement the network security policy defined by the security rules.

14. The method of claim 13, wherein the device-specific configuration instructions or security parameter settings comprise at least one of set a network address, a selected subset of the devices to a security zone, a security mode of one of the devices, a valid inbound connection for one of the devices, a valid outbound connection for one of the devices, a key-based or certificate-based security protocol for one of the devices, a whitelist identifying devices with which one of the devices is permitted to communication, a network router setting, a network switch setting, or an authoritative policy source.

15. The method of claim 10, further comprising rendering, by the system on a client device, a nodal diagram representing the model data, wherein the nodal diagram comprises nodes representing the devices and lines between the nodes representing the physical network connections and the communication paths.

16. The method of claim 15, further comprising:
receiving, by the system via interaction with the graphical display interface, modifications to at least one of the communication paths, and
updating, by the system, the model data in accordance with the modification.

17. The method of claim 10, wherein the security rules comprise communication restrictions indicating that communications between two devices are permitted when initiate by a specific device.

18. A non-transitory computer-readable medium having stored thereon executable instructions that, in response to execution, cause a computer system comprising at least one processor to perform operations, the operations comprising:
reading design data relating to an industrial automation system, wherein the design data is generated by an industrial control project development platform;
identifying, based on an analysis of the design data, devices of the industrial automation system, physical network connections between the devices, and communication paths between pairs of the devices based on analysis of the design data;
generating model data representing the devices, the physical network connections, and the communication paths;
generating security rules based on the model data, wherein the security rules consist of permitted network communications between pairs of the devices;
translating the security rules to device-specific configuration instructions or security parameter settings in a format executable by respective devices; and
sending the device-specific configuration instructions or security parameter settings to the respective devices.

19. The non-transitory computer-readable medium of claim 18, wherein the reading the design data comprises reading at least one of an industrial controller program file, controller I/O configuration data, a human-machine interface application, configuration data for an industrial device, hardware diagram data, or network architecture design data.

20. The non-transitory computer-readable medium of claim 18, wherein the identifying the communication paths comprises identifying the communication paths based on I/O module configuration data of an industrial controller, a read instruction of an industrial controller program that references an industrial device, a write instruction of the industrial controller program that references an industrial device, a global tag defined for the industrial controller that references an industrial device, or communication setting data of one or more of the devices.

* * * * *